(12) United States Patent
Pathem et al.

(10) Patent No.: US 12,340,829 B2
(45) Date of Patent: *Jun. 24, 2025

(54) LUBRICANTS AND METHODS TO DETERMINE DEWETTING THICKNESS THEREOF

(71) Applicant: Western Digital Technologies, Inc., San Jose, CA (US)

(72) Inventors: Bala Krishna Pathem, Fremont, CA (US); Nicholas Ryan Conley, Apex, NC (US); Bruno Jean Marchon, Palo Alto, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,014

(22) Filed: Dec. 13, 2023

(65) Prior Publication Data
US 2024/0110117 A1    Apr. 4, 2024

Related U.S. Application Data

(63) Continuation of application No. 17/864,265, filed on Jul. 13, 2022, now Pat. No. 11,898,116, which is a
(Continued)

(51) Int. Cl.
*G11B 5/725*    (2006.01)
*C08G 65/00*    (2006.01)
(Continued)

(52) U.S. Cl.
CPC .......... *G11B 5/7257* (2020.08); *C08G 65/007* (2013.01); *C10M 107/38* (2013.01);
(Continued)

(58) Field of Classification Search
None
See application file for complete search history.

(56) References Cited

U.S. PATENT DOCUMENTS 6,099,937 A    8/2000    Gui et al.
6,731,446 B2   5/2004    Ikeda et al.
(Continued)

FOREIGN PATENT DOCUMENTS

CN    105452333 A    3/2016
CN    111032625 A    4/2020
(Continued)

OTHER PUBLICATIONS

Guo et al., "A multidentate lubricant for use in hard disk drives at sub-nanometer thickness"; Journal of Applied Physics, 2012; https://aip.scitation.org/doi/10.1063/1.3677984; 8 pages.
(Continued)

*Primary Examiner* — Peter Vincent Agustin
(74) *Attorney, Agent, or Firm* — LOZA & LOZA, LLP; Gabriel Fitch

(57) ABSTRACT

A lubricant including a plurality of segments including a divalent center segment and two sidechain segments, each including a perfluoroalkyl ether moieties is provided in which a dewetting thickness of the lubricant may be determined based in-part on a segment weight average molecular weight of the segments. A magnetic recording medium and a magnetic data storage system including the lubricant are also provided.

21 Claims, 6 Drawing Sheets

Related U.S. Application Data continuation of application No. 17/227,097, filed on Apr. 9, 2021, now Pat. No. 11,414,617.

(60) Provisional application No. 63/136,991, filed on Jan. 13, 2021.

(51) Int. Cl.
  C10M 107/38 (2006.01)
  G11B 5/48 (2006.01)
  C10N 20/04 (2006.01)
  C10N 40/18 (2006.01)
  C10N 50/08 (2006.01)
  G11B 5/00 (2006.01)

(52) U.S. Cl.
  CPC ..... *G11B 5/4826* (2013.01); *C10M 2213/043* (2013.01); *C10N 2020/04* (2013.01); *C10N 2040/18* (2013.01); *C10N 2050/08* (2013.01); *G11B 2005/0021* (2013.01); *G11B 5/4866* (2013.01)

(56) References Cited

U.S. PATENT DOCUMENTS

| | | |
|---|---|---|
| 7,715,302 B2 | 5/2010 | Ohta et al. |
| 8,178,480 B2 | 5/2012 | Hamakubo et al. |
| 8,787,130 B1 | 7/2014 | Yuan et al. |
| 9,117,475 B2 | 8/2015 | Nakata et al. |
| 9,382,496 B1 | 7/2016 | Knigge et al. |
| 9,466,322 B2 | 10/2016 | Deng et al. |
| 9,598,657 B2 | 3/2017 | Isobe et al. |
| 10,262,685 B2 | 4/2019 | Pathem |
| 10,373,632 B2 | 8/2019 | Brand et al. |
| 10,766,844 B2 | 9/2020 | Valsecchi et al. |
| 10,899,883 B2 | 1/2021 | Galimberti et al. |
| 10,947,476 B2 | 3/2021 | Lu et al. |
| 11,414,617 B2* | 8/2022 | Pathem ............... C10M 107/38 |
| 11,898,116 B2* | 2/2024 | Pathem ............... G11B 5/7257 |
| 2002/0119316 A1* | 8/2002 | Shukla ............... C23C 14/0605 427/407.1 |
| 2003/0176629 A1 | 9/2003 | Blomquist et al. |
| 2003/0181633 A1 | 9/2003 | Blomquist et al. |
| 2003/0185986 A1* | 10/2003 | Ma ............... C23C 14/022 427/127 |
| 2005/0031907 A1* | 2/2005 | Matsuyama ............ G11B 5/725 427/127 |
| 2006/0229217 A1* | 10/2006 | Liu ............... C10M 107/48 508/422 |
| 2007/0060487 A1 | 3/2007 | Burns et al. |
| 2010/0035083 A1 | 2/2010 | Yang et al. |
| 2011/0117386 A1 | 5/2011 | Li et al. |
| 2012/0097194 A1 | 4/2012 | McDaniel et al. |
| 2012/0219826 A1 | 8/2012 | Li et al. |
| 2012/0251843 A1 | 10/2012 | Yan et al. |
| 2013/0161181 A1* | 6/2013 | Guo ............... C23C 14/0605 204/192.1 |
| 2014/0234666 A1 | 8/2014 | Knigge et al. |
| 2015/0235664 A1* | 8/2015 | Deng ............... C10M 145/24 360/75 |
| 2015/0275352 A1* | 10/2015 | Ng ............... C23C 14/586 428/835.2 |
| 2015/0361212 A1 | 12/2015 | Takahashi et al. |
| 2016/0068778 A1* | 3/2016 | Conley ............... G11B 5/8408 427/127 |
| 2016/0137947 A1 | 5/2016 | Isobe et al. |
| 2016/0260452 A1* | 9/2016 | Pathem ............... C10M 107/48 |
| 2016/0329074 A1 | 11/2016 | Karis et al. |
| 2017/0260472 A1 | 9/2017 | Sagata et al. |
| 2018/0233167 A1* | 8/2018 | Sakane ............... G11B 5/40 |
| 2018/0268853 A1 | 9/2018 | Shimokawa et al. |
| 2019/0352573 A1 | 11/2019 | Hatta et al. |
| 2020/0010619 A1 | 1/2020 | Minami et al. |
| 2022/0154093 A1 | 5/2022 | Pathem et al. |
| 2022/0220406 A1* | 7/2022 | Pathem ............... G11B 5/7257 |
| 2022/0282176 A1 | 9/2022 | He et al. |
| 2022/0290066 A1* | 9/2022 | He ............... G11B 5/7253 |
| 2022/0364008 A1* | 11/2022 | Pathem ............... G11B 5/4826 |
| 2024/0110117 A1* | 4/2024 | Pathem ............... C10M 107/38 |

FOREIGN PATENT DOCUMENTS

| | | |
|---|---|---|
| CN | 111278797 A | 6/2020 |
| EP | 3555174 A1 | 10/2019 |
| JP | 2004161811 A | 6/2004 |
| JP | 4654339 B2 | 3/2011 |
| JP | 2019067468 A | 4/2019 |
| KR | 20100067037 A | 6/2010 |
| WO | 2010038773 A1 | 4/2010 |
| WO | 2015/182321 A1 | 12/2015 |
| WO | 2017/099075 A1 | 6/2017 |
| WO | 2018159232 A1 | 9/2018 |
| WO | 2021002178 A1 | 1/2021 |

OTHER PUBLICATIONS

Guo et al., "Multidentate functionalized lubricant for ultralow head/disk spacing in a disk drive"; Journal of Applied Physics; 2006; https://www.researchgate.net/publication/252269467_Multidentate_functionalized_lubricant_for_ultralow_headdisk_spacing_in_a_disk_drive; 9 pages.

Marchon et al., "Fomblin Multidentate Lubricants for Ultra-Low Magnetic Spacing"; IEEE Transactions on Magnetics; vol. 42, No. 10; Oct. 2006; https://ieeexplore.ieee.org/document/1704346; 4 pages.

Marchon, Bruno, "Lubricant Design Attributes for Subnanometer Head-Disk Clearance"; IEEE Transactions on Magnetics; vol. 45, No. 2; Feb. 2009; https://ieeexplore.ieee.org/document/4782079?reload=true; 6 pages.

Rhew et al., "Thermal Stability of Modified Perfluoropolyether Lubricants for Application in Heat Assisted Magnetic Recording"; Proceedings of the ASME/STLE 2011 International Joint Tribology Conference; 2011; https://doi.org/10.1115/IJTC2011-61044; 2 pages.

Jones et al., "Laser-Induced Thermo-Desorption of Perfluoropolyether Lubricant from the Surface of a Heat-Assisted Magnetic Recording Disk: Lubricant Evaporation and Diffusion"; ResearchGate; Jul. 1, 2015; https://www.researchgate.net/publication/281528079_Laser-Induced_Thermo-Desorption_of_Perfluoropolyether_Lubricant_from_the_Surface_of_a_Heat-Assisted_Magnetic_Recording_Disk_Lubricant_Evaporation_and_Diffusion; 7 pages.

Wu, Lin, "Modelling and simulation of the lubricant depletion process induced by laser heating in heat-assisted magnetic recording system"; IOP Publishing: Nanotechnology; vol. 18, No. 21; Apr. 27, 2007; https://iopscience.iop.org/article/10.1088/0957-4484/18/21/215702/pdf; 9 pages.

Zhang et al., "Lubrication for Heat-Assisted Magnetic Recording Media"; IEEE Transactions on Magnetics; vol. 42, Issue 10, Oct. 2006; https://ieeexplore.ieee.org/document/1704360; 3 pages.

International Search Report and Written Opinion for International Application No. PCT/US2021/041499, dated Sep. 9, 2021, 13 pages.

International Search Report and Written Opinion for International Application No. PCT/US2021/041500, dated Sep. 14, 2021, 15 pages.

Brunner, Ralf, "Properties of Carbon Overcoats and Perfluoro-Polyether Lubricants in Hard Disk Drives"; Ph.D Dissertation; University of California, San Diego; 2009; https://escholarship.org/uc/item/24w0q2v0; 248 pages.

* cited by examiner

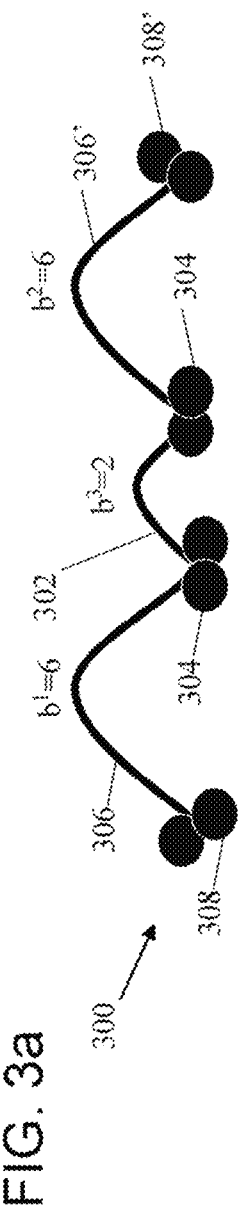
FIG. 3a
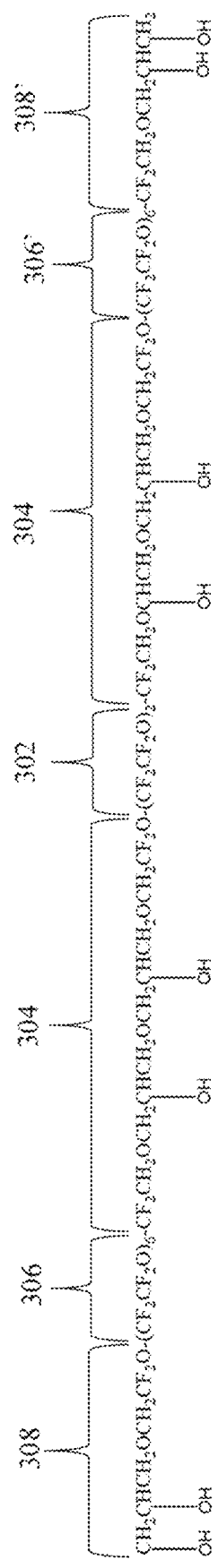
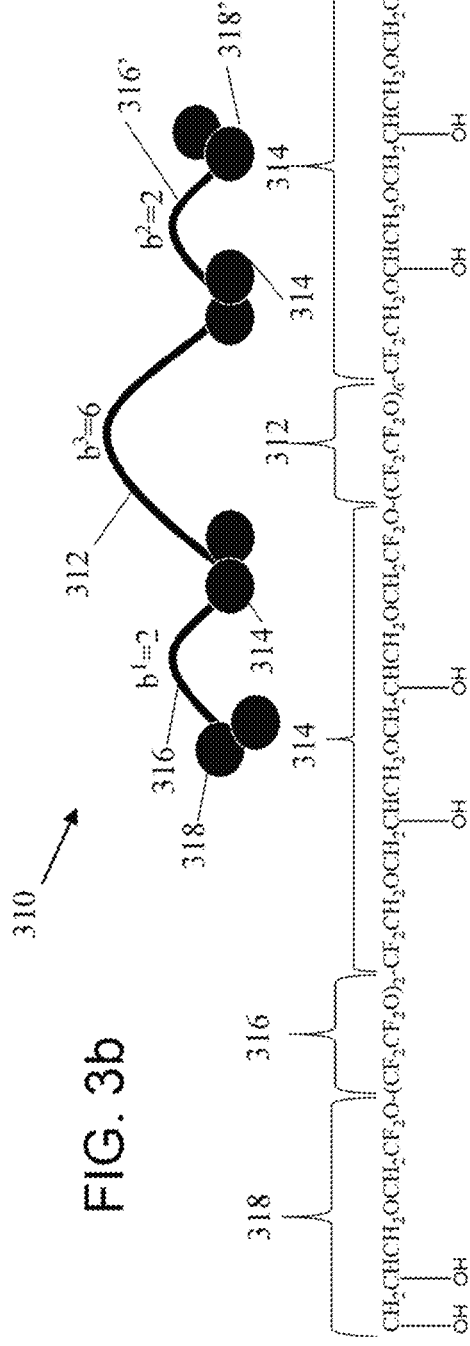
FIG. 3b

500

502

Generating a chemical representation of the lubricant including a plurality of segments, each linked together through an ether linkage according to a general formula:

$Re^1\text{-}Rb^1\text{-}Ri\text{-}Rc\text{-}Ri\text{-}Rb^2\text{-}Re^2$;

wherein Rc is a divalent center segment including a perfluoroalkyl ether moiety;

wherein each of $Rb^1$ and $Rb^2$ is, independently, a sidechain segment including a perfluoroalkyl ether moiety;

wherein each Ri is, independently, a divalent linking segment including a functional group including elements from Group 13 – 17 of the periodic table of the elements;

wherein each of $Re^1$ and $Re^2$ is, independently, a monovalent end segment including a functional group including elements from Group 13 – 17 of the periodic table of the elements; and wherein $Rb^1 \neq Rc \neq Rb^2$;

504

Determining a segment weight average molecular weight (α) according to the formula: α = [molecular weight of $Rb^1$ + molecular weight of $Rb^2$ + molecular weight of Rc] ÷ 3;

506

Determining the dewetting thickness $T_{dw}$ of the lubricant according to the formula:
$T_{dw} = 0.0045(\alpha) + 8.0226$.

FIG. 5

LUBRICANTS AND METHODS TO DETERMINE DEWETTING THICKNESS THEREOF

CROSS-REFERENCE TO RELATED APPLICATIONS

This application is a continuation of U.S. patent application Ser. No. 17/864,265, filed on Jul. 13, 2022 entitled, "LUBRICANTS AND METHODS TO DETERMINE DEWETTING THICKNESS THEREOF," which claims priority to and the benefit of U.S. patent application Ser. No. 17/227,097, filed on Apr. 9, 2021 entitled, "LUBRICANTS AND METHODS TO DETERMINE DEWETTING THICKNESS THEREOF," which claims priority to and the benefit of U.S. Provisional Patent Application No. 63/136,991, filed on Jan. 13, 2021 entitled, "LUBRICANTS AND METHODS TO DETERMINE DEWETTING THICKNESS THEREOF," the entire content of each of which is incorporated herein by reference.

FIELD

The instant disclosure is directed to lubricants, and more particularly, to lubricants and methods for determining a dewetting thickness of the lubricants, where the lubricants are suitable for use in various applications, including magnetic recording media.

INTRODUCTION

The instant disclosure relates to lubricants suitable for use in magnetic storage media, and in particular, media configured for heat assisted magnetic recording (HAMR). Magnetic storage systems, such as a hard disk drive (HDD) systems, are utilized in a wide variety of devices in both stationary and mobile computing environments. Examples of devices that incorporate magnetic storage systems include data center storage systems, desktop computers, portable notebook computers, portable hard disk drives, network storage systems, high definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks are generally formed of two main components, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the disks. HAMR is a technique that can increase the areal density (AD) of written data on a magnetic storage medium having high coercivity using high recording temperatures to write information to the medium. However, the high recording temperatures applied to the media may present challenges.

Due to the high temperatures involved, lubricants suitable for use in HAMR drives may benefit from high thermal stability. Other examples of magnetic storage media include flexible tape media usable for magnetic tape recording. As such, there is a need in the art for lubricants having high thermal stability and other properties for use in HAMR drives or in magnetic tape recording. In addition, determination of a lubricant dewetting thickness and other parameters is typically done by first producing the lubricant and then testing the lubricant. There is a need in the art to design and/or select lubricants having specific properties suitable for specific uses prior to synthesizing the lubricant.

SUMMARY

In one aspect, this disclosure provides a lubricant comprising: a plurality of segments, each linked together by ether linkage according to a general formula:

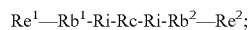

$$Re^1—Rb^1\text{-Ri-Rc-Ri-}Rb^2—Re^2;$$

wherein Rc is a divalent center segment including a perfluoroalkyl ether moiety;

wherein each of $Rb^1$ and $Rb^2$ is, independently, a side-chain segment including a perfluoroalkyl ether moiety;

wherein each Ri is, independently, a divalent linking segment including a functional group including elements from Group 13-17 of the periodic table of the elements;

wherein each of $Re^1$ and $Re^2$ is, independently, a monovalent end segment including a functional group including elements from Group 13-17 of the periodic table of the elements;

wherein $Rb^1 \neq Rc \neq Rb^2$; and wherein the lubricant comprises a segment weight average molecular weight ($\alpha$) determined according to the formula:

$\alpha$=[molecular weight of $Rb^1$+molecular weight of $Rb^2$+molecular weight of Rc]÷3; and a dewetting thickness $T_{dw}$ determined according to the formula:

$$T_{dw}=\psi(\alpha);$$

wherein $\psi$ is a function determined from a relationship between dewetting thickness and segment weight average molecular weight of a plurality of other lubricants;

wherein each of the plurality of other lubricants includes one or more segments including perfluoroalkyl ether moieties;

wherein the segment weight average molecular weight of each of the other lubricants is equal to the weight average molecular weight of the one or more segments including perfluoroalkyl ether moieties present in the respective other lubricant; and wherein the segment weight average molecular weight of each of the plurality of other lubricants is from about 300 g/mol to about 5,000 g/mol.

In one aspect, this disclosure also provides a method to determine a dewetting thickness of a lubricant, comprising the steps of:

a) generating a chemical representation of the lubricant including a plurality of segments, each linked together through an ether linkage according to a general formula:

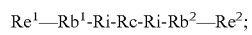

$$Re^1—Rb^1\text{-Ri-Rc-Ri-}Rb^2—Re^2;$$

wherein Rc is a divalent center segment including a perfluoroalkyl ether moiety;

wherein each of $Rb^1$ and $Rb^2$ is, independently, a side-chain segment including a perfluoroalkyl ether moiety;

wherein each Ri is, independently, a divalent linking segment including a functional group including elements from Group 13-17 of the periodic table of the elements;

wherein each of $Re^1$ and $Re^2$ is, independently, a monovalent end segment including a functional group including elements from Group 13-17 of the periodic table of the elements; and wherein $Rb^1 \neq Rc \neq Rb^2$;

b) determining a segment weight average molecular weight (α) according to the formula:

α=[molecular weight of $Rb^1$+molecular weight of $Rb^2$+molecular weight of Rc]÷3;

and c) determining the dewetting thickness $T_{dw}$ of the lubricant according to the formula:

$T_{dw}$=0.0045(α)+8.0226.

In one aspect, this disclosure also provides a data storage system, comprising: at least one magnetic head; a magnetic recording medium including a lubricant according one or more aspects disclosed herein; a drive mechanism for positioning the at least one magnetic head over the magnetic recording medium; and a controller electrically coupled to the at least one magnetic head for controlling operation of the at least one magnetic head.

In one aspect, this disclosure also provides a data storage system, comprising a slider comprising at least one magnetic head and an air bearing surface (ABS), wherein a lubricant according one or more aspects disclosed herein is disposed on the ABS; and a magnetic recording medium including a magnetic recording layer; wherein the slider is configured to write information to the magnetic recording layer using heat assisted magnetic recording (HAMR).

Other aspects and advantages of the present invention will become apparent from the following detailed description, which, when taken in conjunction with the drawings, illustrate by way of example, the principles of the invention.

BRIEF DESCRIPTION OF THE DRAWINGS

FIG. 3a is a schematic drawing showing a lubricant in accordance with one aspect of the disclosure;

FIG. 3b is a schematic drawing showing another lubricant in accordance with one aspect of the disclosure;

FIG. 5 is a flowchart of a method for determining a dewetting thickness of a lubricant in accordance with one aspect of the disclosure.

DETAILED DESCRIPTION

Figure 1A:
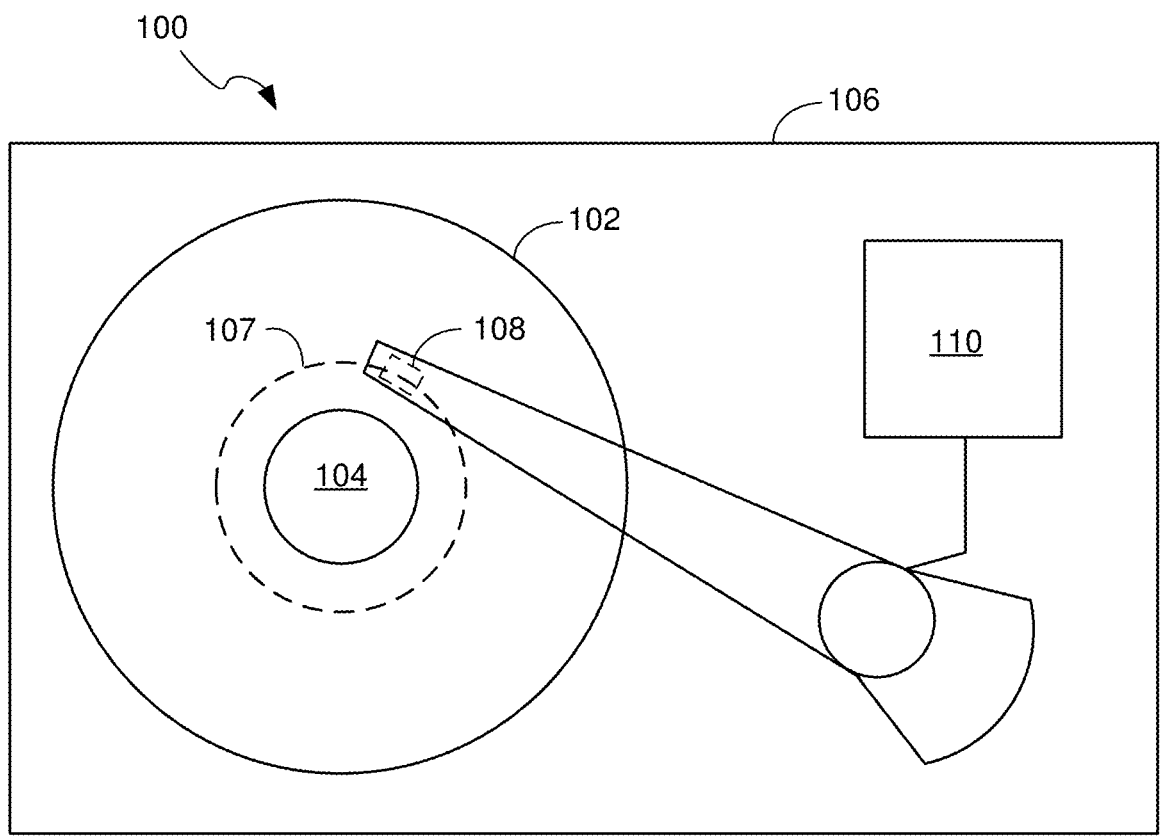
FIG. 1a is a diagram schematically illustrating a data storage device including a slider and a magnetic recording medium in accordance with one aspect of the disclosure.

Dewetting thickness of lubricants utilized on magnetic recording media is known to affect a variety of properties of the lubricant layer including the average thickness of the lubricant layer, the siloxane contamination robustness of the media provided by the lubricant, the head wear characteristics of a data storage system including magnetic recording media having the lubricant, and a number of other properties. The dewetting thickness of lubricants was previously determined experimentally. In one aspect, this disclosure relates to a lubricant in which a dewetting thickness $T_{dw}$ of the lubricant may be determined according to a formula, which relates dewetting thickness to a segment weight average molecular weight of the lubricant. The dewetting thickness formula may be determined from a relationship between dewetting thickness data of other previously known lubricants and the segment weight average molecular weight of these known lubricants. In one aspect, the $T_{dw}$ of the lubricant may be determined by a linear fit of dewetting thickness to a segment weight average molecular weight of the other lubricants. In one aspect, this disclosure involves a method to determine a dewetting thickness of a lubricant that includes the steps of (1) providing a representation of the lubricant, e.g., the chemical formula of a proposed or possible lubricant, (2) determining the segment weight average molecular weight of this lubricant from the chemical formula, followed by (3) determining the dewetting thickness of the lubricant according to the dewetting thickness formula. In turn, a lubricant may be designed and/or selected according to its structure to possess a dewetting thickness within a particular range. This may be done instead of having to produce multiple lubricants and determine by trial and error which is suitable for a particular purpose as is common in the art. The ability to predict a dewetting thickness may be particularly useful in developing or improving HAMR media or HAMR storage systems due to the high temperatures and other challenges associated with such media and systems.

Definitions

For purposes herein, and the claims thereto, the new numbering scheme for the Periodic Table Groups is used as described in Chemical and Engineering News, 63(5), pg. 27 (1985). Therefore, a "group 4 metal" is an element from group 4 of the Periodic Table, e.g. Hf, Ti, or Zr. For purposes herein, molecular weight refers to weight average molecular weight (Mw) and is expressed as grams per mole (g/mol) unless otherwise specified.

As used herein, and unless otherwise specified, the term "$C_n$," means hydrocarbon(s) having n carbon atom(s) per molecule, where n is a positive integer. Likewise, a "$C_m$-$C_y$," group or compound refers to a group or compound comprising carbon atoms at a total number thereof in the range from m to y. Thus, a $C_1$-$C_4$ alkyl group refers to an alkyl group that includes carbon atoms at a total number thereof in the range of 1 to 4, e.g., 1, 2, 3 and 4.

The term "moiety" refers to one or more covalently bonded atoms which form a part of a molecule. The terms "group," "radical," "moiety", and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{20}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

For purposes herein, a heteroatom is any non-carbon atom, selected from groups 13 through 17 of the periodic table of the elements. In one or more aspects, heteroatoms are non-metallic atoms selected from B, N, O, Si, P, S, As Se, Te and the halogens F, Cl, Br, I, and At.

Unless otherwise indicated, the term "substituted" means that at least one hydrogen atom has been replaced with at least one non-hydrogen atom or a functional group.

For purposes herein, a functional group includes one or more of a hydrocarbyl group, a heteroatom, or a heteroatom containing group, such as halogen (such as Br, Cl, F or I) or at least one functional group such as —NR*$_2$, —NR*—CO—R*, —OR*, *—O—CO—R*, —CO—O—R*, —SeR*, —TeR*, —PR*$_2$, —PO—(OR*)$_2$, —O—PO—(OR*)$_2$, —AsR*$_2$, —SbR*$_2$, —SR*, —SO$_2$—(OR*)$_2$, —BR*$_2$, —SiR*$_3$, —(CH$_2$)q-SiR*$_3$, or a combination thereof, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring.

In one or more aspects, functional groups may include: a saturated C$_1$-C$_{20}$ radical, an unsaturated C$_1$-C$_{20}$ radical, an alicyclic C$_3$-C$_{20}$ radical, a heterocyclic C$_3$-C$_{20}$ radical, an aromatic C$_5$-C$_{20}$ radical, a heteroaromatic C$_5$-C$_{20}$ radical, a cyclotriphosphazine radical, a halogen, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)q-SiR*$_3$, —(CF$_2$)q-SiR*$_3$, or a combination thereof, wherein q is 1 to 10 and each R* is, independently a hydrogen, a halogen, a saturated, unsaturated, aromatic, and/or heterocyclic C$_1$-C$_{20}$ radical.

For purposes herein, a functional group, which is attachable to a surface of a magnetic recording medium, refers to functional groups having increased affinity for that surface relative to the affinity of perfluoroalkyl ethers to that same surface. Increased affinity may include Van der Walls forces, weak London Dispersion forces, dipole-dipole forces, and/or the like, and/or one or more types of bonds and/or dative bonds with the surface of the magnetic recording media, preferably with a protective overcoat of a recording media. In one or more aspects, a functional group which is attachable to a surface of a magnetic recording medium refers to functional groups having increased affinity for the carbon overcoat (COC) layer of the magnetic recording media, relative to the affinity of perfluoroalkyl ethers to that same surface.

A heterocyclic ring, also referred to herein as a heterocyclic radical, is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring. A substituted heterocyclic ring is a heterocyclic ring where a hydrogen of one of the ring atoms is substituted, e.g., replaced with a hydrocarbyl, or a heteroatom containing group.

A "compound" refers to a substance formed by the chemical bonding of a plurality chemical elements. A "derivative" refers to a compound in which one or more of the atoms or functional groups of a precursor compound have been replaced by another atom or functional group, generally by means of a chemical reaction having one or more steps.

For purposes herein, unless otherwise specified, the lubricants include a plurality of segments and each segment is attached to the other segment by an ether bond, e.g., a —C—O—C-linkage. For purposes herein, a segment including a perfluoropolyalkyl ether moiety has the general formula:

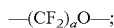

wherein each a is from 1 to 10. A segment including a perfluoroalkyl ether moiety has the general formula:

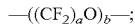

wherein each a is from 1 to 10 and b is the number of repeating units in the segment.

The perfluoroalkyl ether moieties present in a particular segment are bonded together to form a perfluoropolyalkyl ether chain. Unless indicated otherwise, each of the perfluoroalkyl ether moieties present in a perfluoropolyalkyl ether segment may be the same or different. For example, the following are each examples of a perfluoropolyalkyl ether segments:

i) —(CF$_2$CF$_2$O)$_b$—, a perfluoropolyethylether segment;
ii) —(CF$_2$CF$_2$CF$_2$O)$_b$—, a perfluoropolypropylether segment;
iii) —(CF$_2$CF$_2$CF$_2$CF$_2$O)$_b$—, a perfluoropolybutylether segment; and
iv) —(CF$_2$CF$_2$O)$_b$—(CF$_2$O)$_{b'}$—, a perfluoropolyethylether-perfluoropolymethylether segment, also referred to in the art as a Z-chain segment.

For purposes herein, the molecular weight of a segment, e.g., a divalent center segment including a perfluoroalkyl ether moiety Rc and/or a divalent sidechain segment including a perfluoroalkyl ether moiety Rb$^1$ and Rb$^2$ is defined as the molecular weight of the perfluoroalkyl ether moieties present in the segment.

Unless otherwise indicated, a divalent center segment, abbreviated Rc herein, refers to a divalent chemical moiety including a perfluoroalkyl ether moiety, or which is formed from one or more perfluoroalkyl ether moieties, that is chemically bonded via an ether linkage to a linking segment moieties on either side.

An intermediate or linking segment, abbreviated as Ri herein, refers to a chemical moiety bonded between the center segment and a sidechain segment by an ether linkage, and which includes at least one functional group, which is preferably selected to attached to the protective layer of the magnetic recording media.

A side chain segment, abbreviated Rb herein, refers to a divalent chemical moiety including a perfluoroalkyl ether moiety, or formed from one or more perfluoroalkyl ether moieties, that is chemically bonded via an ether linkage to a linking segment moiety and an end segment.

An end segment, abbreviated Re herein, refers to a mono-valent radical which includes at least one functional group preferably selected to attached to the protective layer of the magnetic recording media. The end moieties are located at either end of a sidechain of the lubricant molecule.

For any particular compound disclosed herein, any general or specific structure presented also encompasses all conformational isomers, regio-isomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

As used herein, the term "aromatic" also refers to pseudo-aromatic heterocycles which are heterocyclic substituents that have similar properties and structures (nearly planar) to aromatic heterocyclic ligands, but are not by definition aromatic; likewise the term aromatic also refers to substituted aromatics.

As used herein, a moiety which is chemically identical to another moiety is defined as being identical in overall composition exclusive of isotopic abundance and/or distribution, and/or exclusive of stereochemical arrangement such as optical isomers, confirmational isomers, spatial isomers, and/or the like.

Data Storage Device

FIG. 1a is a top schematic view of a data storage device 100 (e.g., disk drive or magnetic recording device) configured for heat assisted magnetic recording (HAMR) including a slider 108 and a magnetic recording medium 102 having a lubricant layer according to one or more aspects of the disclosure. The laser (not visible in FIG. 1a but see 114 in FIG. 1B) is positioned with a head/slider 108. Disk drive 100 may include one or more disks/media 102 to store data. Disk/media 102 resides on a spindle assembly 104 that is mounted to a drive housing. Data may be stored along tracks in the magnetic recording layer of disk 102. The reading and writing of data is accomplished with the head 108 (slider) that may have both read and write elements (108a and 108b). The write element 108a is used to alter the properties of the magnetic recording layer of disk 102 and thereby write information thereto. In one aspect, head 108 may have magneto-resistive (MR), giant magneto-resistive (GMR), or tunnel magneto-resistive (TMR) elements. In an alternative aspect, head 108 may be another type of head, for example, a Hall effect head. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an example HAMR system is shown, the various embodiments described may be used in other EAMR or non-EAMR magnetic data recording systems, including perpendicular magnetic recording (PMR) disk drives or magnetic tape drives.

Figure 1B:
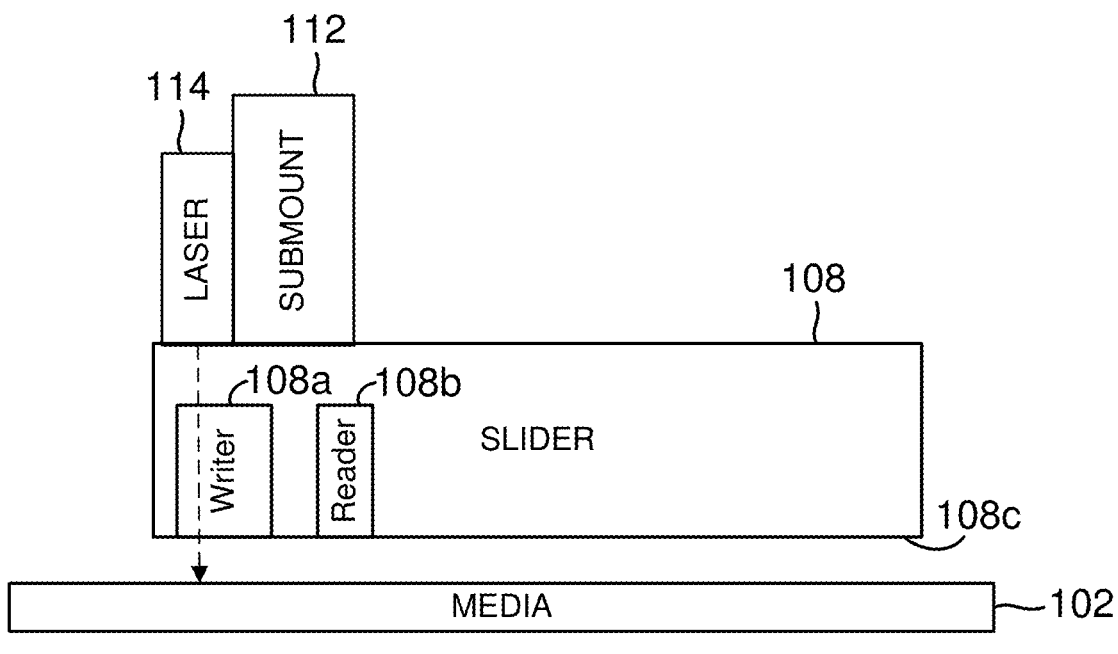
FIG. 1B is a side schematic view of the slider and magnetic recording medium of FIG. 1a in accordance with one aspect of the disclosure.

FIG. 1B is a side schematic view of the slider 108 and magnetic recording medium 102 of FIG. 1a. The magnetic recording medium 102 includes a lubricant layer (see FIG. 3) in accordance with one or more aspects of the disclosure. The slider 108 may include a sub-mount 112 attached to a top surface of the slider 108. The laser 114 may be attached to the sub-mount 112, and possibly to the slider 108. The slider 108 includes a write element (e.g., writer) 108a and a read element (e.g., reader) 108b positioned along an air bearing surface (ABS) 108c of the slider for writing information to, and reading information from, respectively, the media 102. In other aspects, the slider may also include a layer of the lubricant (not shown).

In operation, the laser 114 is configured to generate and direct light energy to a waveguide (e.g., along the dashed line) in the slider which directs the light to a near field transducer (NFT) near the air bearing surface (e.g., bottom surface) 108c of the slider 108. Upon receiving the light from the laser 114 via the waveguide, the NFT generates localized heat energy that heats a portion of the media 102 within or near the write element 108a, and near the read element 108b. The anticipated recording temperature is in the range of about 350° C. to 400° C. In the aspect illustrated in FIG. 1B, the laser directed light is disposed within the writer 108a and near a trailing edge of the slider. In other aspects, the laser directed light may instead be positioned between the writer 108a and the reader 108b. FIGS. 1A and 1B illustrate a specific example of a HAMR system. In other examples, the magnetic recording medium 102 with the lubricant layer according to aspects of the disclosure can be used in other suitable HAMR systems (e.g., with other sliders configured for HAMR).

Magnetic Recording Medium

Figure 2:
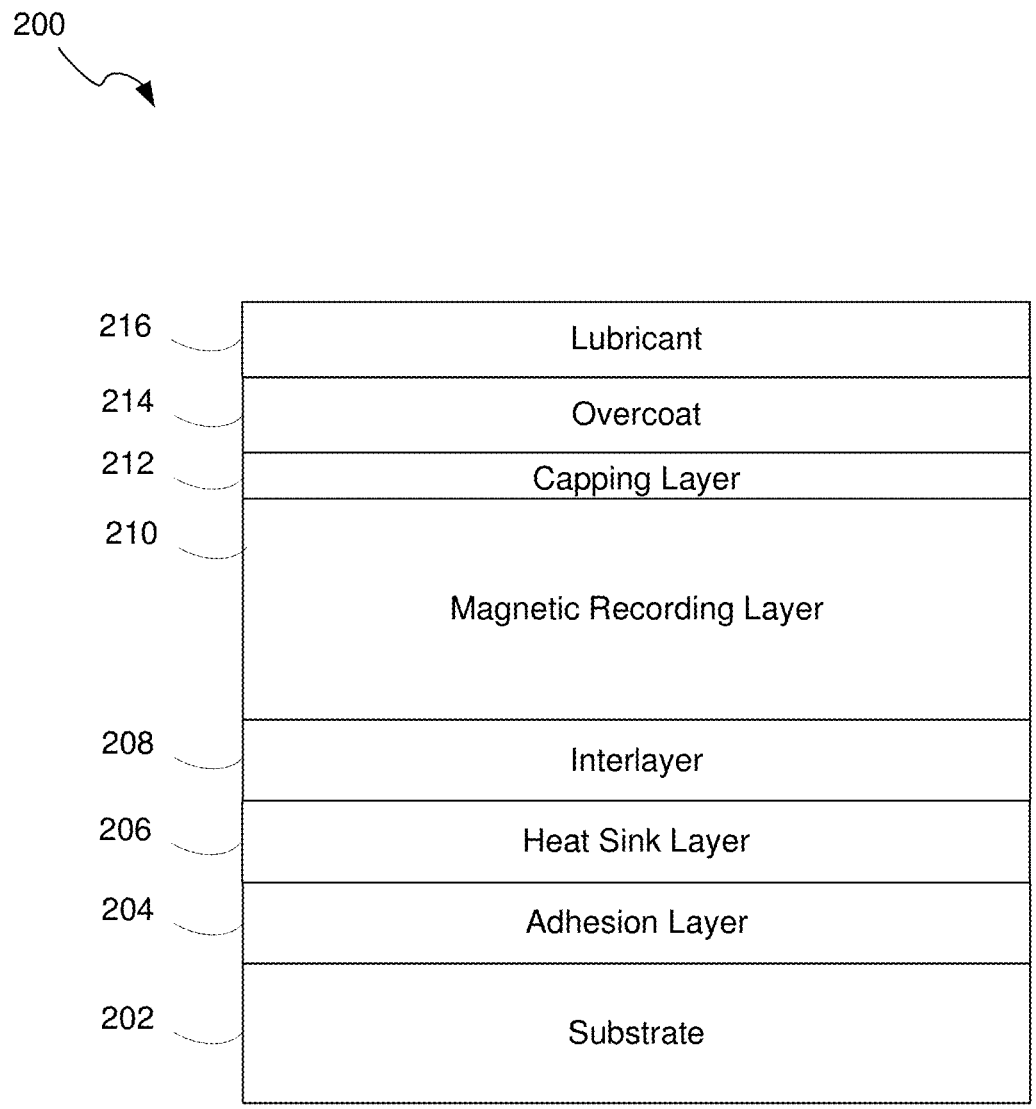
FIG. 2 is a side schematic view of a heat assisted magnetic recording (HAMR) medium including a lubricant layer in accordance with one aspect of the disclosure.

FIG. 2 is a side schematic view of a magnetic recording medium 200 having a lubricant layer according to one or more aspects of the disclosure. In one aspect, the magnetic recording medium 200 may be used in a data storage system configured for HAMR (e.g., disk drive 100). The magnetic recording medium 200 has a stacked structure with a substrate 202 at a bottom/base layer, an adhesion layer 204 on the substrate 202, a heat sink layer 206 on the adhesion layer 204, an interlayer 208 on the heat sink layer 206, a magnetic recording layer (MRL) 210 on the interlayer 208, a capping layer 212 on the MRL 210, an overcoat layer 214 on the capping layer 212, and a lubricant layer 216 on the overcoat layer 214. In one aspect, the magnetic recording medium 200 may have a soft magnetic underlayer (SUL) between the adhesion layer 204 and the heat sink layer 206. In one aspect, the magnetic recording medium 200 may have a thermal resistance layer (TRL) between the interlayer 208 and the heat sink layer 206. In one aspect, for disk drive applications, the substrate 202 can be made of one or more materials such as an Al alloy, NiP plated Al, glass, glass ceramic, and/or combinations thereof. In one aspect for magnetic tape recording applications, the substrate 202 can include a flexible material, such a film made of one of various types of resins, polyesters, polyolefins, polyamides, and the like, or combinations thereof. The substrate may include non-magnetic materials, and may be laminated. In some aspects, the magnetic recording medium 200 may have some or all of the layers illustrated in FIG. 2 and/or additional layer(s) in various stacking orders. It should also be noted that each layer shown in FIG. 2 may include one or more sub-layers. For example, the magnetic recording layer may comprise multiple layers in certain embodiments.

Lubricants

In one aspect, lubricants according to aspects disclosed herein may function as boundary lubricants which may be used in various mechanical devices, including data storage systems configured for magnetic recording (e.g., hard disk drives or tape drives) and other microelectronic mechanical systems. Boundary lubricants may form a lubricant layer when one or more functional groups of the lubricant attach or otherwise engage with the surface being lubricated. For instance, one or more boundary lubricants may form a lubricant layer 216 on a magnetic recording medium 200 (e.g. a disk that includes a magnetic recording layer 210) that moves relative to other parts in the mechanical device. This lubricant layer 216 may help to protect the magnetic recording medium from frictional wear and/or damage caused by interactions between the magnetic recording medium and other parts in the mechanical device (e.g., interactions, such as contact, between a slider and the magnetic recording medium). In other words, this boundary layer may help limit or minimize solid-to-solid contact.

FIG. 3a illustrates an exemplary boundary lubricant (Example 1, generally indicated as 300), according to one aspect of the disclosure both as a figure and the corresponding chemical formula. As shown in FIG. 3a, the Example 1 boundary lubricant 300 includes a plurality of segments, each linked together through an ether linkage according to a general formula:

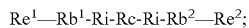

wherein Rc is a divalent center segment 302 including a perfluoroalkyl ether moiety; $Rb^1$ is a first sidechain segment 306, $Rb^2$ is a second sidechain segment 306', each independently includes a perfluoroalkyl ether moiety; each Ri segment is, independently, a divalent linking segment 304 including a functional group including elements from Group 13-17 of the periodic table of the elements, which in this aspect are hydroxyl groups (—OH). $Re^1$ is a first end segment 308 and $Re^2$ is second end segment 308', each is a monovalent end segment including a functional group including elements from Group 13-17 of the periodic table of the elements, which in this aspect are hydroxyl groups (—OH). As shown in FIG. 3a, $Rb^1 \neq Rc \neq Rb^2$ and $Rb^1 = Rb^2$.

In the aspect shown in FIG. 3a, each of the sidechain segments 306 includes a perfluoroethyl ether moiety —$(CF_2CF_2O)_b$— where b is 6, e.g., $b^1$ and $b^2$ shown in FIG. 3a, and the center segment 302 includes a perfluoroethyl ether moiety —$(CF_2CF_2O)_b$— where b is 2, e.g., $b^3$ shown in FIG. 3a. Each of the linking segments 304 includes a hydroxyl functional group, along with the end groups $Re^1$ (308) and $Re^2$ (308'), which are selected for the ability to attach to the surface of the carbon overcoat of the recording media, due in part to being highly polar moieties.

FIG. 3b illustrates another exemplary boundary lubricant (Example 2, generally indicated as 310), according to another aspect of the disclosure both as a figure and the corresponding chemical formula. As shown in FIG. 3b, the Example 2 boundary lubricant 310 includes a plurality of segments, each linked together through an ether linkage according to a general formula:

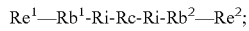

wherein Rc is a divalent center segment 312 including a perfluoroalkyl ether moiety; $Rb^1$ is a first sidechain segment 316, $Rb^2$ is a second sidechain segment 316', each independently includes a perfluoroalkyl ether moiety; each Ri segment is, independently, a divalent linking segment 314 including a functional group including elements from Group 13-17 of the periodic table of the elements, which in this aspect are hydroxyl groups (—OH). $Re^1$ is a first end segment 318 and $Re^2$ is second end segment 318', each is a monovalent end segment including a functional group including elements from Group 13-17 of the periodic table of the elements, which in this aspect are hydroxyl groups (—OH). In this aspect of the disclosure, $Rb^1 \neq Rc \neq Rb^2$, and $Rb^1 = Rb^2$.

In the aspect shown in FIG. 3b, each of the sidechain segments 316 includes a perfluoroethyl ether moiety —$(CF_2CF_2O)_b$— where b is 2, e.g., $b^1$ and $b^2$ shown in FIG. 3b, and the center segment 312 includes a perfluoroethyl ether moiety —$(CF_2CF_2O)_b$— where b is 6, e.g., $b^3$ shown in FIG. 3b. Each of the linking segments 314 along with the end groups $Re^1$ (318) and $Re^2$ (318') include a functional group, which in this aspect are hydroxyl groups (—OH).

Method to Determine Dewetting Thickness

Table 1 (shown below) presents the dewetting thickness and segment weight average molecular weight data obtained from a plurality of other lubricants. Each of the other lubricants includes at least one segment including perfluoroalkyl ether moieties linked to other segments through an ether linkage which include a functional group including elements from Group 13-17 of the periodic table of the elements. Some of the other lubricants of Table 1 include a divalent center segment Rc' including perfluoroalkyl ether moieties terminated by monovalent end segments $Re^{1'}$ and $Re^{2'}$ including a functional group including elements from Group 13-17 of the periodic table of the elements, e.g., according to the general formula:

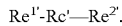

Other lubricants used to produce Table 1 include a plurality of segments, each linked together through an ether linkage according to a general formula:

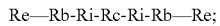

wherein Rc is a divalent center segment including a perfluoroalkyl ether moiety; each Rb is a sidechain segment that includes a perfluoroalkyl ether moiety; the Ri segments are divalent linking segments including a functional group including elements from Group 13-17 of the periodic table of the elements, and Re is a monovalent end segment including a functional group including elements from Group 13-17 of the periodic table of the elements.

TABLE 1

Segment Weight Average Molecular Weight and Dewetting Thickness of known lubricants

| Table 1 Segment Weight Average Molecular Weight α g/mol | Dewetting Thickness $T_{dw}$ (Å) |
|---|---|
| 1500 | 16.6 |
| 2210 | 18.4 |
| 3390 | 23.5 |
| 3820 | 25.2 |
| 2210 | 19.3 |
| 2240 | 15.9 |
| 1290 | 11.5 |
| 1290 | 12.6 |
| 4200 | 26.9 |
| 408 | 8 |
| 872 | 12.5 |
| 640 | 15 |
| 930 | 11 |

Figure 4:
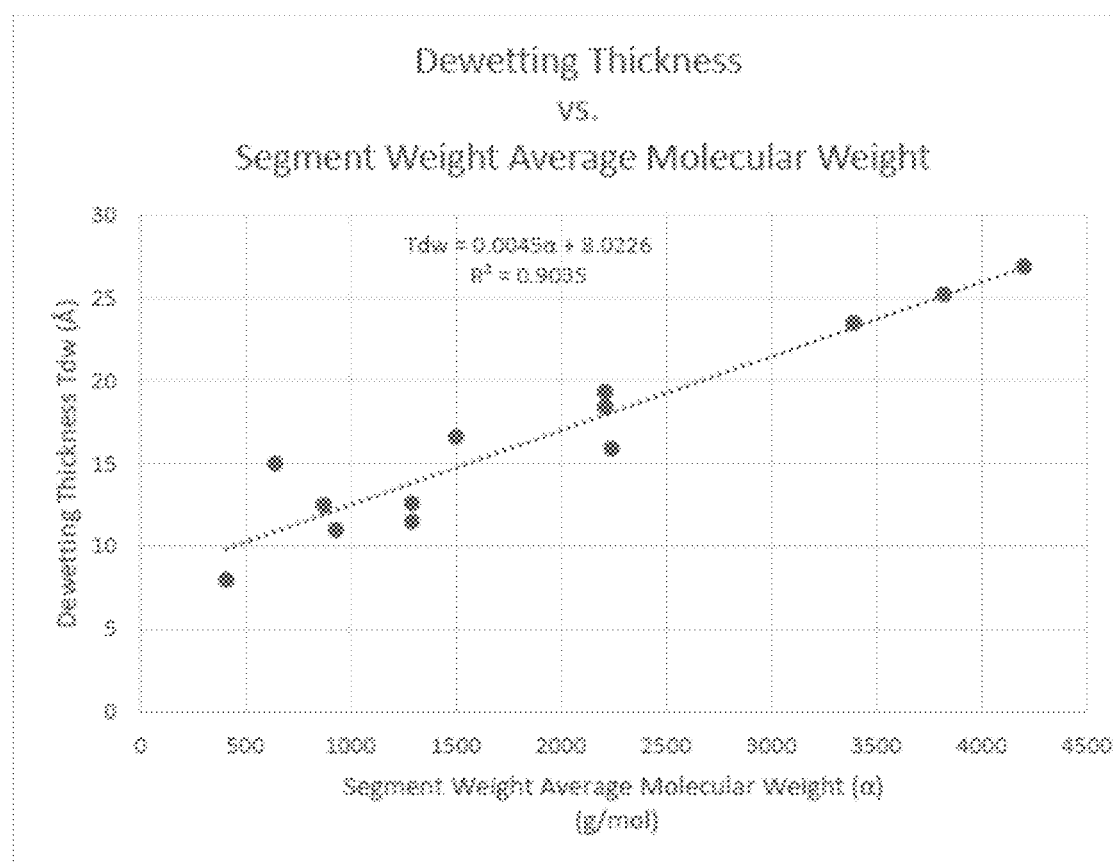
FIG. 4 is a graph showing a plot of dewetting thickness versus a segment weight average molecular weight of a plurality of other lubricants in accordance with one aspect of the disclosure.

A plot of the data presented in Table 1 is shown in FIG. 4. Applicant has discovered that a dewetting thickness Td w of a lubricant may be determined according to the formula:

$$T_{dw} = \psi(\alpha);$$

in which a is the segment weight average molecular weight of the lubricant, and ψ is a function determined from a relationship between dewetting thickness and segment weight average molecular weight of a plurality of other lubricants; wherein each of the plurality of other lubricants independently includes a center segment and/or sidechain segments including perfluoroalkyl ether moieties. In one aspect, ψ is a function determined from a relationship between dewetting thickness and segment weight average molecular weight of a plurality of other lubricants, wherein each of the plurality of other lubricants includes one or more segments including perfluoroalkyl ether moieties, wherein the segment weight average molecular weight of each of the other lubricants is equal to the weight average molecular weight of the one or more segments including perfluoroalkyl ether moieties present in the respective other lubricant, and wherein the segment weight average molecular weight of each of the plurality of other lubricants is from about 300 g/mol to about 5,000 g/mol.

In one aspect, the function w is a linear fit of dewetting thickness versus segment weight average molecular weight of a plurality of the other lubricants. In one aspect the relationship may be determined according to a linear fit of these data, while in other aspects other mathematical fits or relationships may be utilized.

In the exemplary aspect of the disclosure shown in FIG. 4, the function $\psi(\alpha)$ is produced from a least squares fit of the dewetting thickness versus the segment weight average molecular weight of a plurality of the other lubricants, which resulted in an essentially linear relationship. A least squares linear fit of these data (as is known in the art) resulted in the equation $T_{dw}=\psi(\alpha)$ being equal to $T_{dw}=0.0045\alpha+8.0226$, with an $R^2$ fit of 0.9035.

Referring to FIG. 5, a method 500 for determining a dewetting thickness of a lubricant is shown according to one aspect of the disclosure. As shown in FIG. 5, the method 500 includes providing a representation of the lubricant including a plurality of segments, each linked together through an ether linkage according to a general formula:

$$Re^1-Rb^1-Ri-Rc-Ri-Rb^2-Re^2;$$

wherein Rc is a divalent center segment including a perfluoroalkyl ether moiety;
wherein each of $Rb^1$ and $Rb^2$ is, independently, a sidechain segment including a perfluoroalkyl ether moiety;
wherein each Ri is, independently, a divalent linking segment including a functional group including elements from Group 13-17 of the periodic table of the elements; and
wherein each of $Re^1$ and $Re^2$ is, independently, a monovalent end segment including a functional group including elements from Group 13-17 of the periodic table of the elements; and wherein $Rb^1 \neq Rc \neq Rb^2$. See operation 502.

The method 500 further includes determining a segment weight average molecular weight ($\alpha$) according to the formula:

$$\alpha=[\text{molecular weight of } Rb^1 + \text{molecular weight of } Rb^2 + \text{molecular weight of } Rc] \div 3.$$

See operation 504.

In various approaches, the method 500 further includes determining a dewetting thickness Td w determined according to the formula:

$$T_{dw}=\psi(\alpha);$$

wherein $\psi$ is a function determined from a relationship between dewetting thickness and a segment weight average molecular weight of a plurality of other lubricants, each of the plurality of other lubricants independently including a center segment and/or sidechain segments including perfluoroalkyl ether moieties. In one aspect, $\psi$ is a function determined from a mathematical fit, e.g., a linear fit of data representing dewetting thickness and segment weight average molecular weight of a plurality of other lubricants. For example, utilizing the equation determined in FIG. 4, such that the method includes determining the dewetting thickness $T_{dw}$ of the lubricant according to the formula: $T_{dw}=0.0045(\alpha)+8.0226$. See operation 506, as shown in FIG. 5.

Returning to FIGS. 3a, and 3b, the segment weight average molecular weight ($\alpha$) of these exemplary aspects of the disclosure is equal to the sum of the molecular weight of $Rb^1$+molecular weight of $Rb^2$+molecular weight of Rc; divided by 3. The molecular weight of each perfluoroethyl ether moiety is 116.015 g/mol. Accordingly, the segment weight average molecular weight ($\alpha$) of the aspect of the disclosure indicated as Example 1 (300) in FIG. 3a is:

Example $1\alpha=(116.015*b^1+116.015*b^2+116.015*b^3)\div 3;$

Example $1\alpha=(116.015*6+116.015*6+116.015*2)\div 3;$

Example $1\alpha=(1624.21)\div 3;$

Example $1\alpha=541.40.$

Likewise, the segment weight average molecular weight ($\alpha$) of the Example 2 aspect of the disclosure indicated as 310 in FIG. 3b is:

Example $2\alpha=(116.015*b^1+116.015*b^2+116.015*b^3)\div 3;$

Example $2\alpha=(116.015*2+116.015*2+116.015*6)\div 3;$

Example $2\alpha=(1160.15)\div 3;$

Example $2\alpha=386.71.$

Utilizing this relationship, the dewetting thickness of the exemplary lubricant Example 1 shown in FIG. 3a may be calculated as follows:

Example 1 $T_{dw}=0.0045\alpha+8.0226;$

Example 1 $T_{dw}=0.0045*541.40+8.0226;$

Example 1 $T_{dw}=10.46$ Å.

The same calculation of the dewetting thickness of the exemplary lubricant Example 2 shown in FIG. 3b results in a dewetting thickness of 9.76 Å. These data are shown in Table 2 along with the measured dewetting thickness of the two exemplary lubricants.

TABLE 2

| Example | Segment Weight Average Molecular Weight $\alpha$ (g/mol) | Calculated Dewetting Thickness Tdw (Å) | Measured Dewetting Thickness Tdw (Å) | Uncertainty |
|---|---|---|---|---|
| EXAMPLE 1 | 541.40 | 10.46 | 10.9 | +/−0.4 Å |
| EXAMPLE 2 | 386.71 | 9.76 | 10.1 | +/−0.2 Å |

As these data show, a method according to one aspect of the disclosure provides a determination of the dewetting thickness of a lubricant within +/−0.5 Å. In one aspect of the disclosure, the dewetting thickness $T_{dw}$ may be determined according to the formula:

$$T_{dw}=\psi(\alpha);$$

wherein $\psi$ is function determined from a plot or other means of fitting data to an equation (e.g., a linear fit) of dewetting thickness to a segment weight average molecular weight of a plurality of other lubricants, each of the plurality of other lubricants independently including a center segment and/or sidechain segments including perfluoroalkyl ether moieties, is about equal to a measured dewetting thickness of the lubricant. In one aspect of the disclosure, the dewetting thickness $T_{dw}$ may be determined according to the formula:

$$T_{dw}=\psi(\alpha);$$

and is equal to a measured dewetting thickness of the lubricant +/− about 10 Å, or about 5 Å, or about 1 Å, or about 0.5 Å.

In one aspect of the disclosure, a method to determine a dewetting thickness of a lubricant includes the steps of providing a representation of the lubricant including a plurality of segments, each linked together through an ether linkage according to a general formula:

$$Re^1-Rb^1-Ri-Rc-Ri-Rb^2-Re^2;$$

wherein Rc is a divalent center segment including a perfluoroalkyl ether moiety; each of $Rb^1$ and $Rb^2$ is, independently, a sidechain segment including a perfluoroalkyl ether moiety; each Ri is, independently, a divalent linking segment including a functional group including elements from Group 13-17 of the periodic table of the elements; and each of $Re^1$ and $Re^2$ is, independently, a monovalent end segment including a functional group including elements from Group 13-17 of the periodic table of the elements, wherein $Rb^1 \neq Rc \neq Rb^2$. It is to be understood that in one aspect of the disclosure, this step of providing, or generating, a representation of the lubricant only requires providing/generating the chemical formula of the lubricant, and does not necessarily require providing the lubricant in physical form. This allows for a lubricant according to the general formula to be evaluated and/or designed to include a particular properties as may be needed for an intended use.

The method further includes determining a segment weight average molecular weight ($\alpha$) of the provided chemical formula according to the formula:

α=[molecular weight of Rb$^1$+molecular weight of Rb$^2$+molecular weight of Rc]÷3, followed by determining the dewetting thickness Td w of the lubricant according to the formula:

$$T_{dw} = \psi(\alpha);$$

wherein ψ is function determined a linear fit of dewetting thickness to a segment weight average molecular weight of a plurality of other lubricants, each of the plurality of other lubricants independently including a center segment and/or sidechain segments including perfluoroalkyl ether moieties.

Aspects of Lubricants

In one aspect of the disclosure, the lubricant includes or is formed from (e.g., comprises, consists essentially of, or consists of) a plurality of segments, each linked together through an ether linkage according to a general formula:

$$Re^1-Rb^1-Ri-Rc-Ri-Rb^2-Re^2;$$

wherein Rc is a divalent center segment including a perfluoroalkyl ether moiety; each of $Rb^1$ and $Rb^2$ is, independently, a sidechain segment including a perfluoroalkyl ether moiety; each Ri is, independently, a divalent linking segment including a functional group including elements from Group 13-17 of the periodic table of the elements; and each of $Re^1$ and $Re^2$ is, independently, a monovalent end segment including a functional group including elements from Group 13-17 of the periodic table of the elements, wherein $Rb^1 \neq Rc \neq Rb^2$.

In one aspect of the disclosure the center segment of the lubricant, Rc includes a perfluoroethyl ether moiety and/or each of the sidechain segments $Rb^1$ and $Rb^2$ includes a perfluoroethyl ether moiety.

In one aspect of the disclosure, each linking segment Ri has the general formula:

wherein each $R^1$ is, independently, a functional group including elements from Group 13-17 of the periodic table of the elements.

In one aspect of the disclosure, end segment $Re^1$ has the general formula:

and $Re^2$ has the general formula:

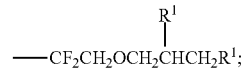

wherein each $R^1$ is, independently, a functional group including elements from Group 13-17 of the periodic table of the elements. The difference between $Re^1$ and $Re^2$ being the additional oxygen atom required to produce an ether linkage between the sidechain segment $Rb^1$, which begins with a carbon atom.

In some aspects, each $R^1$ is, independently, a functional group which includes: a saturated $C_1$-$C_{20}$ radical, an unsaturated $C_1$-$C_{20}$ radical, an alicyclic $C_3$-$C_{20}$ radical, a heterocyclic $C_3$-$C_{20}$ radical, an aromatic $C_5$-$C_{20}$ radical, a heteroaromatic $C_5$-$C_{20}$ radical, a cyclotriphosphazine radical, a halogen, $-NR^*_2$, $-NR^*-CO-R^*$, $-OR^*$, $-O-CO-R^*$, $-CO-O-R^*$, $-SeR^*$, $-TeR^*$, $-PR^*_2$, $-PO-(OR^*)_2$, $-O-PO-(OR^*)_2$, $-N=P(NR^*_2)_3$, $-AsR^*_2$, $-SR^*$, $-SO_2-(OR^*)_2$, $-BR^*_2$, $-SiR^*_3$, $-(CH_2)q-SiR^*_3$, $-(CF_2)q-SiR^*_3$, or a combination thereof, wherein q is 1 to 10 and each $R^*$ is, independently a hydrogen, a halogen, a saturated, unsaturated, aromatic, and/or heterocyclic $C_1$-$C_{20}$ radical, and wherein two or more $R^*$ may join together to form a ring structure, and wherein at least one functional group is selected to be attachable to the protective overcoat of the magnetic recording media. In some aspects of the disclosure each $R^1$ is a hydroxyl (—OH).

In one aspect of the disclosure, Rc is of the formula:

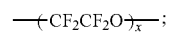

$Rb^1$ is of the formula:

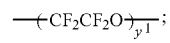

and $Rb^2$ is of the formula:

wherein each of x, $y^1$ and $y^2$ is, independently, an integer from 1 to 10, wherein $y^1 \neq x \neq y^2$. This results in an asymmetric arrangement of the lubricant segments in that all of the perfluoro alkyl ether segments are not identical. In one aspect of the disclosure, x is less than $y^1$ and x is less than $y^2$. In another aspect of the disclosure, x is greater than $y^1$ and x is greater than $y^2$. In some aspects of the disclosure, $y^1 \neq y^2$, and in other aspects of the disclosure, $y^1 = y^2$.

In one aspect of the disclosure the lubricant is of the general formula:

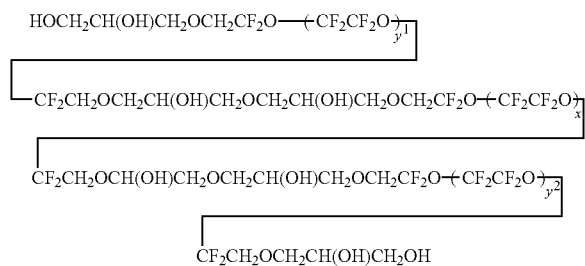

wherein each of x, $y^1$, and $y^2$ is an integer from 1 to 10, or from 2 to 8, or from 3 to 6; subject to the proviso that $y^1 \neq x \neq y^2$.

In one aspect of the disclosure, the dewetting thickness $T_{dw}$ is according to the formula:

$$T_{dw} = 0.0045(\alpha) + 8.0226; \text{ wherein}$$

$$\alpha = (116.015 * y^1 + 116.015 * y^2 + 116.015 * x) \div 3.$$

In one aspect of the disclosure, the lubricant has a weight average molecular weight of greater than or equal to about 1 kiloDalton (kDa), or from about 1 to about 20 kDa, or from about 2 to about 10 kDa, or from about 3 to about 7 kDa, or from about 1 to about 5 kDa, or 2 to about 4 kDa. In one or more aspects, the lubricants are essentially pure compounds, having a polydispersity, defined as the number average molecular weight Mn divided by the weight average molecular weight Mw (Mn/Mw) from about 1 to 2, or from about 1 to about 1.5, or from about 1 to about 1.05.

Fabrication of Magnetic Recording Media

Applicant has discovered that a relatively high molecular weight, e.g., greater than or equal to about 1000 atomic mass units (amu), or preferably greater than or equal to about 3000 amu, is less prone to evaporation, which is of particular importance under the relatively high temperature conditions used within HAMR drives. Applicant has further discovered that the induced asymmetry present in the molecular structure allows the use of the segment weight average molecular weight of the main chain segments, e.g., the center segment and the two sidechain segments, to impart flexibility to tune the dewetting thickness of the lubricant. The accuracy of the ability to determine the dewetting thickness of a lubricant increases when the perfluoroalkyl ether segments are formed from perfluoroethyl ether moieties. The lubricants according to one or more aspects of the disclosure include enhanced adsorption, reduced lube pickup, and a reduction in the layer thickness required in combination with an improved coverage. Lubricants according to aspects of the disclosure thus allow for operation of the head closer to the media, using a minimal lubricant thickness set according to the dewetting thickness of the lubricant. This reduces the number of available sites that are prone to contamination, and renders the lubricant layer more robust while improving head wear of the magnetic media utilizing the lubricant.

In one or more aspects, the average thickness of the lubricant layer of the magnetic recording medium is less than about 3 nanometers, or less than about 2 nm, or less than about 1 nm, or less than or equal to about 0.8 nm. In some aspects, the lubricant of the magnetic recording medium has an average thickness from about 0.3 nm to about 3 nm, or from about 0.3 to about 1 nm.

In one or more aspects of the magnetic recording medium, the lubricant has a bonding percentage of at least 70%, or at least 75%, or at least 80%, or at least 85%, corresponding to a degree of bonding of the lubricant to the total area of an upper surface of the protective overcoat or other surface on which the lubricant is located.

In one aspect, a magnetic data storage system includes a magnetic head; a magnetic recording medium according to any one or a combination of aspects disclosed herein including a lubricant according to one or more aspects disclosed herein, a drive mechanism for positioning the magnetic head over the magnetic recording medium; and a controller electrically coupled to the magnetic head for controlling operation of the magnetic head.

Figure 6:
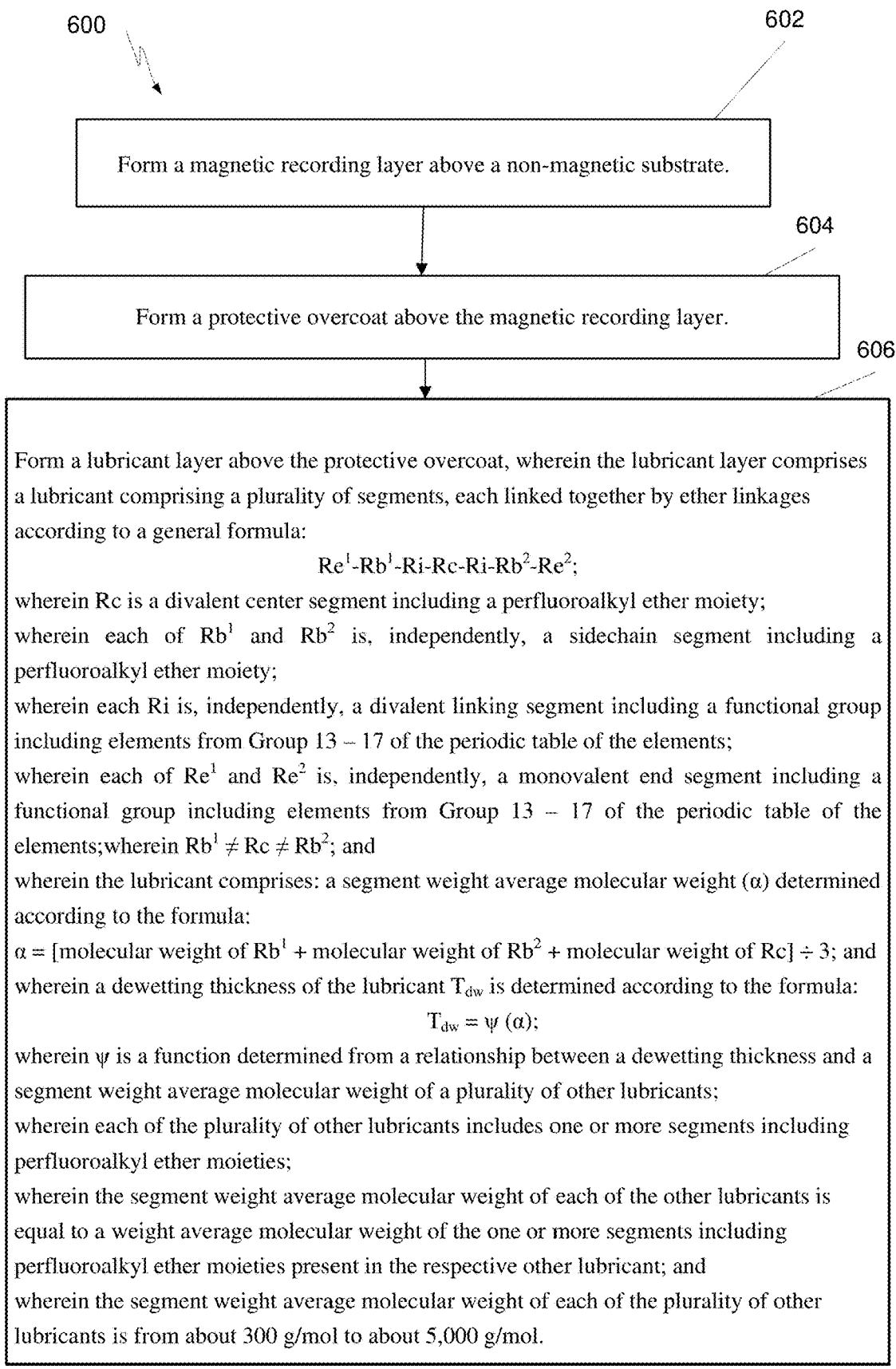
FIG. 6 is a flowchart of a method for forming a magnetic recording medium having a lubricant layer thereon, in accordance with one aspect of the disclosure.

Referring to FIG. 6, a method 600 for forming a magnetic recording medium having a boundary lubricant is shown according to one aspect of the disclosure. In one aspect, method 600 can be used to fabricate any of the media shown in FIGS. 1a, 1b, 2. As shown in FIG. 6, the method 600 includes forming a magnetic recording layer on a non-magnetic substrate. See operation 602. In various approaches, the method 600 may also include forming other layers positioned between the non-magnetic substrate and the magnetic recording layer. These other layers may include, for example, one or more underlayers, soft underlayers, adhesion layers, etc. (e.g., any of the layers shown in FIG. 2). As also shown in FIG. 6, the method 600 further includes forming a protective overcoat above the magnetic recording layer and/or forming a capping layer on the magnetic layer and forming a protective overcoat layer on the capping layer. See operation 604. The method 600 further includes forming a lubricant layer on the protective overcoat layer. See operation 606. This lubricant layer may include a lubricant including a plurality of segments, each linked together through an ether linkage according to a general formula:

$$Re^1\text{—}Rb^1\text{-}Ri\text{-}Rc\text{-}Ri\text{-}Rb^2\text{—}Re^2;$$

wherein Rc is a divalent center segment including a perfluoroalkyl ether moiety;

each of $Rb^1$ and $Rb^2$ is, independently, a sidechain segment including a perfluoroalkyl ether moiety;

each Ri is, independently, a divalent linking segment including a functional group including elements from Group 13-17 of the periodic table of the elements; and each of $Re^1$ and $Re^2$ is, independently, a monovalent end segment including a functional group including elements from Group 13-17 of the periodic table of the elements;

wherein $Rb^1 \neq Rc \neq Rb^2$;

the lubricant having a segment weight average molecular weight ($\alpha$) determined according to the formula:

$$\alpha = [\text{molecular weight of } Rb^1 + \text{molecular weight of } Rb^2 + \text{molecular weight of } Rc] \div 3; \text{ and}$$

a dewetting thickness $T_{dw}$ determined according to the formula:

$$T_{dw} = \psi(\alpha);$$

wherein $\psi$ is function determined from a relationship between a dewetting thickness and a segment weight average molecular weight of a plurality of other lubricants, which may be a linear fit of these data, each of the plurality of other lubricants independently including a center segment and/or sidechain segments including perfluoroalkyl ether moieties.

It is important to note that in alternative approaches, the lubricant layer formed on the protective overcoat may include any aspect of the lubricant described herein, singly and/or in any combination.

In various aspects, the lubricant layer can be formed on the magnetic recording medium, specifically on the protective overcoat, via a dip coating method. For instance, in one aspect the magnetic recording medium may be dipped into a lubricant bath including the multidentate perfluoropolyether boundary lubricant according to one or more aspects of the disclosure and a fluorocarbon solvent such as Vertrel-XF. After a predetermined amount of time, the magnetic recording medium may be removed from the lubricant bath at a controlled rate. The solvent may then evaporate, leaving behind a lubricant layer comprising the boundary lubricant according to one aspect of the disclosure. The percentage of the lubricant remaining on the surface of the magnetic recording medium after disposition of the lubricant may be referred to as the bonded percentage or the bonding percentage. The bonding percentage may be quantified for various time periods by exposing the lubricated magnetic recording medium with the solvent used in the lubricant bath.

The thickness of the lubricant layer may be tuned by controlling the submergence duration of the magnetic recording medium in the lubricant bath, the rate at which the magnetic recording medium is removed from the coating solution, and/or the concentration of the boundary lubricant according to one or more aspects of the disclosure in the lubricant bath.

In one or more aspects, the concentration of lubricant in the lubricant bath may be in a range from about 0.1 g/L to about 0.2 g/L. In yet other aspects, the concentration of the lubricant in the lubricant bath may be selected so as to achieve a resulting lubricant layer with a thickness in a range from about less than or equal to about 3 nanometers (nm), or less than or equal to about 2 nm, or less than or equal to about 1 nm or from about 0.3 nm to less than about 1 nm.

It is important to note that formation of the lubricant layer on the surface of the magnetic recording medium, specifically on the surface of the protective overcoat, is not limited to dip coating, but may also involve spin coating, spray coating, a vapor deposition, combinations thereof, or any other suitable coating process as would be understood by one having skill in the art upon reading the present disclosure. In addition, the magnetic recording layer, the protective overcoat, and/or any of the other layers of the media (e.g., including each of the layers shown for media 200 in FIG. b) may be formed using any of numerous deposition methods that are known in the art.

It should be noted that methodology presented herein for at least some of the various aspects may be implemented, in whole or in part, in computer hardware, by hand, using specialty equipment, and/or the like, and combinations thereof.

Moreover, any of the structures and/or steps may be implemented using known materials and/or techniques, as would become apparent to one skilled in the art upon reading the disclosure.

Aspects Listing

Having described the various aspects of the disclosure herein, further specific aspects include those set forth in the following paragraphs:

A1. A lubricant comprising: a plurality of segments, each linked together by ether linkages according to a general formula:

$$Re^1-Rb^1-Ri-Rc-Ri-Rb^2-Re^2;$$

wherein Rc is a divalent center segment including a perfluoroalkyl ether moiety;

wherein each of $Rb^1$ and $Rb^2$ is, independently, a sidechain segment including a perfluoroalkyl ether moiety;

wherein each Ri is, independently, a divalent linking segment including a functional group including elements from Group 13-17 of the periodic table of the elements;

wherein each of $Re^1$ and $Re^2$ is, independently, a monovalent end segment including a functional group including elements from Group 13-17 of the periodic table of the elements;

wherein $Rb^1 \ne Rc \ne Rb^2$; and wherein the lubricant comprises: a segment weight average molecular weight ($\alpha$) determined according to the formula:

$$\alpha = [\text{molecular weight of } Rb^1 + \text{molecular weight of } Rb^2 + \text{molecular weight of } Rc] \div 3;$$

and wherein a dewetting thickness of the lubricant $T_{dw}$ is determined according to the formula:

$$T_{dw} = \psi(\alpha);$$

wherein $\psi$ is a function determined from a relationship between dewetting thickness and segment weight average molecular weight of a plurality of other lubricants;

wherein each of the plurality of other lubricants includes one or more segments including perfluoroalkyl ether moieties;

wherein the segment weight average molecular weight of each of the other lubricants is equal to the weight average molecular weight of the one or more segments including perfluoroalkyl ether moieties present in the respective other lubricant; and wherein the segment weight average molecular weight of each of the plurality of other lubricants is from about 300 g/mol to about 5,000 g/mol.

A2. The lubricant according to aspect A1, wherein each functional group includes: a saturated $C_1$-$C_{20}$ radical, an unsaturated $C_1$-$C_{20}$ radical, an alicyclic $C_3$-$C_{20}$ radical, a heterocyclic $C_3$-$C_{20}$ radical, an aromatic $C_5$-$C_{20}$ radical, a heteroaromatic $C_5$-$C_{20}$ radical, a cyclotriphosphazine radical, a halogen, $-NR^*_2$, $-NR^*-CO-R^*$, $-OR^*$, $-O-CO-R^*$, $-CO-O-R^*$, $-SeR^*$, $-TeR^*$, $-PR^*_2$, $-PO-(OR^*)_2$, $-O-PO-(OR^*)_2$, $-N=P(NR^*_2)_3$, $-AsR^*_2$, $-SR^*$, $-SO_2-(OR^*)_2$, $-BR^*_2$, $-SiR^*_3$, $-(CH_2)q$-$SiR^*_3$, $-(CF_2)q$-$SiR^*_3$, or a combination thereof, wherein q is 1 to 10 and each $R^*$ is, independently, a hydrogen, a halogen, a saturated, unsaturated, aromatic, and/or heterocyclic $C_1$-$C_{20}$ radical, and wherein two or more $R^*$ may join together to form a ring structure, and wherein at least one functional group is selected to be attachable to the protective overcoat of the magnetic recording media.

A3. The lubricant according to aspect A1 or A2, wherein each functional group is a hydroxyl (—OH).

A4. The lubricant according to any one of aspects A1 through A3, including a weight average molecular weight from about 1 to 20 kiloDaltons (kDa) and a polydispersity of from about 1 to 2.

A5. The lubricant according to any one of aspects A1 through A4, wherein Rc includes a perfluoroethyl ether moiety and each of $Rb^1$ and $Rb^2$ includes a perfluoroethyl ether moiety.

A6. The lubricant according to any one of aspects A1 through A5, wherein each Ri has the general formula:

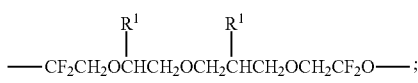

wherein each $R^1$ is, independently, a functional group including elements from Group 13-17 of the periodic table of the elements.

A7. The lubricant according to any one of aspects A1 through A6, wherein $Re^1$ has the general formula:

$Re^2$ has the general formula:

wherein each $R^1$ is, independently, a functional group including elements from Group 13-17 of the periodic table of the elements.

A8. The lubricant according to any one of aspects A1 through A7, wherein:

Rc is of the formula:

$Rb^1$ is of the formula:

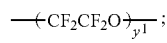

$Rb^2$ is of the formula:

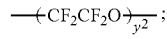

wherein each of x, $y^1$ and $y^2$ is, independently, an integer from 1 to 10.

A9. The lubricant according to aspect A8, wherein x is less than $y^1$ and x is less than $y^2$.

A10. The lubricant according to aspect A8, wherein x is greater than $y^1$ and x is greater than $y^2$.

A11. The lubricant according to aspect A8, A9, or A10, wherein $y^1 \neq y^2$.

A12. The lubricant according to aspect A8, A9, or A10, wherein $y^1 = y^2$.

A13. The lubricant according to any one of aspects A6 through A12, wherein each $R^1$ is a hydroxyl (—OH).

A14. The lubricant according to any one of aspects A1 through A13 including the formula:

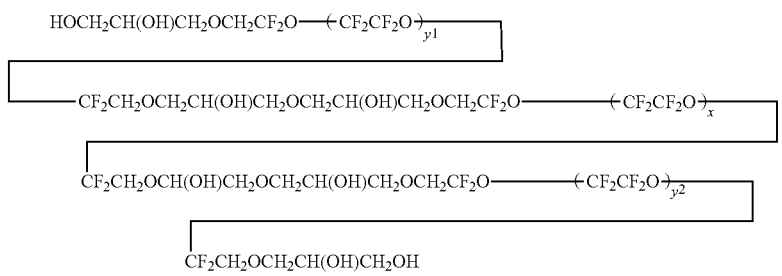

wherein each of x, $y^1$, and $y^2$ is an integer from 1 to 10; and $y^1 \neq x \neq y^2$.

A15. The lubricant according to any one of aspects A1 through A14, wherein the dewetting thickness $T_{dw}$ is according to the formula:

$T_{dw} = 0.0045(\alpha) + 8.0226$;

wherein α=[molecular weight of $Rb^1$+molecular weight of $Rb^2$+molecular weight of Rc]÷3.

A16. The lubricant according to any one of aspects A6 through A14, wherein the dewetting thickness $T_{dw}$ is according to the formula:

$T_{dw} = 0.0045(\alpha) + 8.0226$; and $\alpha = (116.015 * y^1 + 116.015 * y^2 + 116.015 * x) \div 3$.

A17. The lubricant according to any one of aspects A1 through A16, including a weight average molecular weight from about 1 to 20 kiloDaltons (kDa) and a polydispersity of from about 1 to 2.

A18. The lubricant according to any one of aspects A1 through A17, including a dewetting thickness of less than or equal to about 3 nm.

A19. A magnetic recording medium, comprising: a magnetic recording layer on a non-magnetic substrate; a protective overcoat on the magnetic recording layer; and a lubricant layer including the lubricant according to any one of aspects A1 through A18 on the protective overcoat.

A20. The magnetic recording medium according to aspect A19, wherein the lubricant has a bonding percentage of about 70% to less than 100%.

A21. The magnetic recording medium according to aspect A19 or A20, wherein an average thickness of the lubricant is less than or equal to about 3 nanometers.

A22. A method to determine a dewetting thickness of a lubricant according to any one of aspects A1 through A18, comprising:

a) providing a representation of the lubricant according to the general formula:

$Re^1$—$Rb^1$-$Ri$-$Rc$-$Ri$-$Rb^2$—$Re^2$;

b) determining a segment weight average molecular weight ($\alpha$) according to the formula:

$\alpha$ = [molecular weight of $Rb^1$ + molecular weight of $Rb^2$ + molecular weight of $Rc$] ÷ 3; and c) determining the dewetting thickness Td w of the lubricant according to the formula:

$T_{dw} = \psi(\alpha)$;

wherein $\psi$ is a function determined from a relationship between dewetting thickness and segment weight average molecular weight of a plurality of other lubricants;

wherein each of the plurality of other lubricants includes one or more segments including perfluoroalkyl ether moieties;

wherein the segment weight average molecular weight of each of the other lubricants is equal to the weight average molecular weight of the one or more segments including perfluoroalkyl ether moieties present in the respective other lubricant; and wherein the segment weight average molecular weight of each of the plurality of other lubricants is from about 300 g/mol to about 5,000 g/mol.

A23. A method to determine a dewetting thickness of a lubricant, comprising:

a) providing a representation of the lubricant including a plurality of segments, each linked together through an ether linkage according to a general formula:

$Re^1$—$Rb^1$-$Ri$-$Rc$-$Ri$-$Rb^2$—$Re^2$;

wherein Rc is a divalent center segment including a perfluoroalkyl ether moiety; each of $Rb^1$ and Rb 2 is, independently, a sidechain segment including a perfluoroalkyl ether moiety;

each Ri is, independently, a divalent linking segment including a functional group including elements from Group 13-17 of the periodic table of the elements; and each of $Re^1$ and Re e is, independently, a monovalent end segment including a functional group including elements from Group 13-17 of the periodic table of the elements;

wherein $Rb^1 \neq Rc \neq Rb^2$;

b) determining a segment weight average molecular weight ($\alpha$) according to the formula:

$\alpha$ = [molecular weight of $Rb^1$ + molecular weight of $Rb^2$ + molecular weight of $Rc$] ÷ 3; and c) determining the dewetting thickness Td w of the lubricant according to the formula:

$T_{dw} = \psi(\alpha)$;

wherein $\psi$ is a function determined from a relationship between dewetting thickness and segment weight average molecular weight of a plurality of other lubricants;

wherein each of the plurality of other lubricants includes one or more segments including perfluoroalkyl ether moieties;

wherein the segment weight average molecular weight of each of the other lubricants is equal to the weight average molecular weight of the one or more segments including perfluoroalkyl ether moieties present in the respective other lubricant; and wherein the segment weight average molecular weight of each of the plurality of other lubricants is from about 300 g/mol to about 5,000 g/mol.

A24. The method according to aspect A22 or A23, wherein the dewetting thickness Td w of the lubricant is according to the formula:

$T_{dw} = 0.0045(\alpha) + 8.0226$.

A25. The method according to any one of aspects A22 through A24, wherein the lubricant includes the formula:

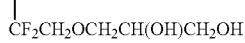

wherein each of x, $y^1$, and $y^2$ is an integer from 1 to 10; $y^1 \neq x \neq y^2$; and $\alpha = (116.015 * y^1 + 116.015 * y^2 + 116.015 * x) \div 3$.

A26. The method according to aspect A25 wherein x is less than $y^1$ and x is less than $y^2$.

A27. The method according to aspect A25 wherein x is greater than $y^1$ and x is greater than $y^2$.

A28. The method according to any one of aspects A25 through A27, wherein $y^1 \neq y^2$.

A29. The method according to any one of aspects A25 through A27, wherein $y^1 = y^2$.

A30. A data storage system, comprising:
- at least one magnetic head;
- a magnetic recording medium according to any one of aspects A19 through A21;
- a drive mechanism for positioning the at least one magnetic head over the magnetic recording medium; and
- a controller electrically coupled to the at least one magnetic head for controlling operation of the at least one magnetic head.

A31. A data storage system, comprising:
- a slider comprising at least one magnetic head and an air bearing surface (ABS), wherein
- a lubricant according to any one of aspects A1 through A18 is disposed on the ABS; and
- a magnetic recording medium including a magnetic recording layer;
- wherein the slider is configured to write information to the magnetic recording layer using heat assisted magnetic recording (HAMR).

The above description is made for the purpose of illustrating the general principles of the present disclosure and is not meant to limit the inventive concepts claimed herein. Further, particular features described herein can be used in combination with other described features in each of the various possible combinations and permutations.

It should be noted that in the development of any such actual aspect, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device, system and/or method used/disclosed herein can also comprise some components other than those cited.

Unless otherwise specifically defined herein, all terms are to be given their broadest possible interpretation including meanings implied from the specification as well as meanings understood by those skilled in the art and/or as defined in dictionaries, treatises, and the like.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 angstroms (Å) refers to a thickness of 10 Å+/−1 Å, e.g., from 0.9 Å to 1.1 Å in this example.

In the summary and this detailed description, each numerical value should be read once as modified by the term "about" (unless already expressly so modified), and then read again as not so modified unless otherwise indicated in context. Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at." The term "and/or" refers to both the inclusive "and" case and the exclusive "or" case, and such term is used herein for brevity. For example, a composition comprising "A and/or B" may comprise A alone, B alone, or both A and B.

Various components described in this specification may be described as "including" and/or made of, and/or "having" certain materials, properties, or compositions of material(s). In one aspect, this can mean that the component consists of certain materials, properties, or compositions of materials. In another aspect, this can mean that the component comprises certain materials, properties, or compositions of material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other.

It is further noted that the term "over" and/or the term "on" as used in the disclosure in the context of one component located over another component, or in the context of one component located on another component, may be used to mean a component that is directly on a surface of another component e.g., disposed in physical contact with the surface of the other component, and/or in another component, e.g., directly embedded in a component. Thus, for example, a first component that is over or on the second component may mean that (1) the first component is located over or above the second component, but not directly touching the second component, (2) the first component is directly on (e.g., directly on a surface of) the second component, and/or (3) the first component is in (e.g., embedded in) the second component.

In the disclosure various ranges in values may be specified, described and/or claimed. It is noted that any time a range is specified, described and/or claimed in the specification and/or claim, it is meant to include the endpoints (at least in one aspect). In another aspect, the range may not include the endpoints of the range. In the disclosure various values (e.g., value X) may be specified, described and/or claimed. In one aspect, it should be understood that the value X may be exactly equal to X. In one aspect, it should be understood that the value X may be "about X," with the meaning noted above. Likewise, when a value is determined according to an equation, it is to be understood that in one aspect, the value is equal to the value calculated according to the equation and in another aspect, the value is about equal to the value calculated according to the equation according to the meaning noted above, or as is expressly provided for, e.g., plus or minus (+/−) a specific amount.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. A lubricant comprising:
   a plurality of segments, each linked together by ether linkages according to a general formula:

Re$^1$—Rb$^1$-Ri-Rc-Ri-Rb$^2$—Re$^2$;

wherein Rc is a divalent center segment including a perfluoroalkyl ether moiety;
   wherein each of Rb$^1$ and Rb$^2$ is, independently, a side-chain segment including a perfluoroalkyl ether moiety;
   wherein each Ri is, independently, a divalent linking segment including a functional group including elements from Group 13-17 of the periodic table of the elements;
   wherein each of Re$^1$ and Re$^2$ is, independently, a monovalent end segment including a functional group including elements from Group 13-17 of the periodic table of the elements; and
   wherein Rb$^1$≠Rc≠Rb$^2$.

2. The lubricant of claim 1, wherein the lubricant has a bonding percentage of about 70% to about 100% corresponding to a total area of a surface on which the lubricant is located, and an average thickness of a layer of the lubricant on the surface is about 0.3 nanometers to about 3 nanometers.

3. The lubricant of claim 1, wherein the lubricant has a bonding percentage of about 80% to about 100% corresponding to a total area of a surface on which the lubricant is located, and an average thickness of a layer of the lubricant on the surface is about 0.3 nanometers to about 3 nanometers.

4. The lubricant of claim 1, wherein the lubricant has a segment weight average molecular weight (α) determined according to the formula:

α=[molecular weight of Rb$^1$+molecular weight of Rb$^2$+molecular weight of Rc]÷3;

and
   wherein a dewetting thickness of the lubricant, $T_{dw}$, is determined according to the formula:

$T_{dw}$=ψ(α);

wherein ψ is a function determined from a relationship between a dewetting thickness and a segment weight average molecular weight of a plurality of other lubricants;
   wherein each of the plurality of other lubricants includes one or more segments including perfluoroalkyl ether moieties;
   wherein the segment weight average molecular weight (α) of each of the plurality of other lubricants is equal to a weight average molecular weight of the one or more segments including perfluoroalkyl ether moieties present in the respective other lubricant; and
   wherein the segment weight average molecular weight of each of the plurality of other lubricants is about 300 grams/mole (g/mol) to about 5,000 g/mol.

5. The lubricant of claim 1,
   wherein each functional group is —OH; or
   wherein each functional group includes: a saturated C$_1$-C$_{20}$ radical, an unsaturated C$_1$-C$_{20}$ radical, an alicyclic C$_3$-C$_{20}$ radical, a heterocyclic C$_3$-C$_{20}$ radical, an aromatic C$_5$-C$_{20}$ radical, a heteroaromatic C$_5$-C$_{20}$ radical, a cyclotriphosphazine radical, a halogen, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)q-SiR*$_3$, —(CF$_2$)q-SiR*$_3$, or a combination thereof, wherein q is 1 to 10 and each R* is, independently, a hydrogen, a halogen, a saturated, unsaturated, aromatic, and/or heterocyclic C$_1$-C$_{20}$ radical, and wherein two or more R* may join together to form a ring structure, and wherein at least one functional group is selected to be attachable to a protective overcoat of a magnetic recording media comprising the lubricant.

6. The lubricant of claim 1, wherein a weight average molecular weight is from about 1 to about 20 kiloDaltons (kDa) and a polydispersity is about 1 to about 2.

7. The lubricant of claim 1, wherein:
   Rc includes a perfluoroethyl ether moiety;
   each of Rb$^1$ and Rb$^2$ includes a perfluoroethyl ether moiety;
   each Ri has the general formula:

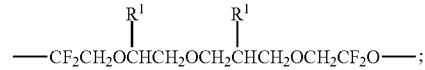

Re$^1$ has the general formula:

and
   Re$^2$ has the general formula:

wherein each R$^1$ is, independently, a functional group including elements from Group 13-17 of the periodic table of the elements, and
   Rc is of the formula:

Rb$^1$ is of the formula:

and
   Rb$^2$ is of the formula:

and
   wherein each of x, y$^1$ and y$^2$ is, independently, an integer from 1 to 10.

8. The lubricant of claim 7, wherein x is less than $y^1$ and x is less than $y^2$; or
wherein x is greater than $y^1$ and x is greater than $y^2$.

9. The lubricant of claim 7, wherein $y^1 \neq y^2$.

10. A lubricant comprising:
a plurality of segments, each linked together by ether linkages according to a general formula:

$Re^1-Rb^1-Ri-Rc-Ri-Rb^2-Re^2$;

wherein Rc is a divalent center segment including a perfluoroalkyl ether moiety;
wherein each of $Rb^1$ and $Rb^2$ is, independently, a side-chain segment including a perfluoroalkyl ether moiety;
wherein each Ri is, independently, a divalent linking segment including an —OH functional group;
wherein each of $Re^1$ and $Re^2$ is, independently, a monovalent end segment including an —OH functional group; and
wherein $Rb^1 \neq Rc \neq Rb^2$.

11. The lubricant of claim 10, wherein the lubricant has a bonding percentage of about 70% to about 100% corresponding to a total area of a surface on which the lubricant is located, and an average thickness of a layer of the lubricant on the surface is about 0.3 nanometers to about 3 nanometers.

12. The lubricant of claim 10, wherein the lubricant has a bonding percentage of about 80% to about 100% corresponding to a total area of a surface on which the lubricant is located, and an average thickness of a layer of the lubricant on the surface is about 0.3 nanometers to about 3 nanometers.

13. The lubricant of claim 10, wherein the lubricant has a segment weight average molecular weight (α) determined according to the formula:

α=[molecular weight of $Rb^1$+molecular weight of $Rb^2$+ molecular weight of Rc]÷3; and wherein a dewetting thickness of the lubricant, $T_{dw}$, is determined according to the formula:

$T_{dw} = \psi(\alpha)$;

wherein ψ is a function determined from a relationship between a dewetting thickness and a segment weight average molecular weight of a plurality of other lubricants;
wherein each of the plurality of other lubricants includes one or more segments including perfluoroalkyl ether moieties;
wherein the segment weight average molecular weight (α) of each of the plurality of other lubricants is equal to a weight average molecular weight of the one or more segments including perfluoroalkyl ether moieties present in the respective other lubricant; and
wherein the segment weight average molecular weight (α) of each of the plurality of other lubricants is about 300 grams/mole (g/mol) to about 5,000 g/mol.

14. The lubricant of claim 10, wherein a weight average molecular weight is from about 1 to about 20 kiloDaltons (kDa) and a polydispersity is about 1 to about 2.

15. A lubricant comprising:
a plurality of segments, each linked together by ether linkages according to a general formula:

$Re^1-Rb^1-Ri-Rc-Ri-Rb^2-Re^2$;

wherein Rc is a divalent center segment including fluorine and oxygen;
wherein each of $Rb^1$ and $Rb^2$ is, independently, a side-chain segment including fluorine and oxygen;
wherein each Ri is, independently, a divalent linking segment including a functional group including elements from Group 13-17 of the periodic table of the elements;
wherein each of $Re^1$ and $Re^2$ is, independently, a monovalent end segment including a functional group including elements from Group 13-17 of the periodic table of the elements; and
wherein $Rb^1 \neq Rc \neq Rb^2$.

16. The lubricant of claim 15, wherein the lubricant has a bonding percentage of about 70% to about 100% corresponding to a total area of a surface on which the lubricant is located, and an average thickness of a layer of the lubricant on the surface is about 0.3 nanometers to about 3 nanometers.

17. The lubricant of claim 15, wherein the lubricant has a bonding percentage of about 80% to about 100% corresponding to a total area of a surface on which the lubricant is located, and an average thickness of a layer of the lubricant on the surface is about 0.3 nanometers to about 3 nanometers.

18. The lubricant of claim 15, wherein the lubricant has a segment weight average molecular weight (α) determined according to the formula:

α=[molecular weight of $Rb^1$+molecular weight of $Rb^2$+molecular weight of Rc]÷3;

and wherein a dewetting thickness of the lubricant, $T_{dw}$, is determined according to the formula:

$T_{dw} = \psi(\alpha)$;

wherein ψ is a function determined from a relationship between a dewetting thickness and a segment weight average molecular weight of a plurality of other lubricants;
wherein each of the plurality of other lubricants includes one or more segments including perfluoroalkyl ether moieties;
wherein the segment weight average molecular weight (α) of each of the plurality of other lubricants is equal to a weight average molecular weight of the one or more segments including perfluoroalkyl ether moieties present in the respective other lubricant; and
wherein the segment weight average molecular weight of each of the plurality of other lubricants is about 300 grams/mole (g/mol) to about 5,000 g/mol.

19. The lubricant of claim 15, wherein a weight average molecular weight is from about 1 to about 20 kiloDaltons (kDa) and a polydispersity is about 1 to about 2.

20. The lubricant of claim 15,
wherein each functional group is —OH; or
wherein each functional group includes: a saturated $C_1$-$C_{20}$ radical, an unsaturated $C_1$-$C_{20}$ radical, an alicyclic $C_3$-$C_{20}$ radical, a heterocyclic $C_3$-$C_{20}$ radical, an aromatic $C_5$-$C_{20}$ radical, a heteroaromatic $C_5$-$C_{20}$ radical, a cyclotriphosphazine radical, a halogen, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)q-SiR*$_3$, —(CF$_2$)q-SiR*$_3$, or a combination thereof, wherein q is 1 to 10 and each R* is, independently, a hydrogen, a halogen, a saturated, unsaturated, aromatic, and/or heterocyclic $C_1$-$C_{20}$ radical, and wherein two or more R* may join together to form a ring structure, and wherein at least one functional group is selected to be attachable to a protective overcoat of a magnetic recording media comprising the lubricant.

21. A lubricant comprising a plurality of segments linked together by ether linkages according to a formula:
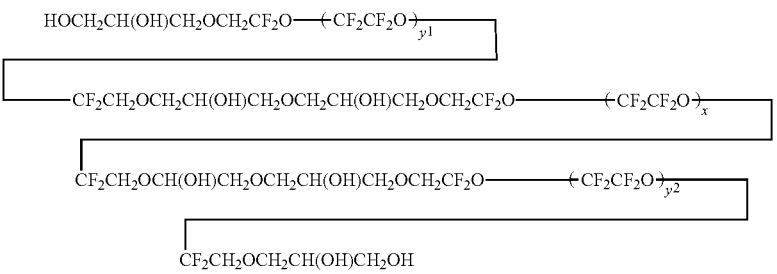
wherein each of x, $y^1$, and $y^2$ is an integer from 1 to 10; and
wherein $y^1 \neq x \neq y_2$.
* * * * *